(12) United States Patent
Rous

(10) Patent No.: US 6,429,246 B1
(45) Date of Patent: Aug. 6, 2002

(54) NONFLAMMABLE HALOGEN-FREE MIXTURE

(75) Inventor: Friedemann Rous, Bayreuth (DE)

(73) Assignee: Alcatel, Paris (FR)

( * ) Notice: Subject to any disclaimer, the term of this patent is extended or adjusted under 35 U.S.C. 154(b) by 729 days.

(21) Appl. No.: 08/819,239

(22) Filed: Mar. 17, 1997

(30) Foreign Application Priority Data

Mar. 19, 1996 (DE) .......................................... 196 10 513

(51) Int. Cl.⁷ .......................... C08L 53/00; C08K 5/098; C08K 3/22; C08K 5/5419
(52) U.S. Cl. ...................... 524/268; 524/261; 524/265; 524/266; 524/267; 524/400; 524/425; 524/436; 524/437; 524/505
(58) Field of Search ................................ 524/261, 266, 524/265, 267, 400, 436, 437, 425, 268, 505

(56) References Cited

U.S. PATENT DOCUMENTS

| 4,273,691 A | | 6/1981 | MacLaury et al. ............ 260/23 |
|---|---|---|---|
| 4,387,176 A | * | 6/1983 | Frye ........................... 524/400 |
| 4,722,858 A | * | 2/1988 | Harbourne et al. ......... 524/436 |
| 4,847,317 A | * | 7/1989 | DoKurno et al. ........... 524/436 |
| 5,104,920 A | * | 4/1992 | Keogh ......................... 524/264 |
| 5,132,350 A | * | 7/1992 | Keogh ......................... 524/436 |
| 5,482,990 A | * | 1/1996 | Jow et al. .................... 524/436 |

FOREIGN PATENT DOCUMENTS

EP          0537013          4/1993

* cited by examiner

Primary Examiner—Peter Szekely
(74) Attorney, Agent, or Firm—Ware, Fressola, Van der Sluys & Adolphson LLP

(57) ABSTRACT

A nonflammable, halogen-free mixture for making thermoplastic polymer materials with increased heat resistance, particularly for manufacturing electrical and optical cables and lines. The mixture comprises: a block or randon block copolymer of polypropylene; a salt of a metal selected from the group consisting of Group II, IIa and IIb metals; a metal hydroxide; a silicone material-selected from the group silicone oil, silicone rubber, and combinations thereof.

12 Claims, No Drawings

NONFLAMMABLE HALOGEN-FREE MIXTURE

BACKGROUND OF THE INVENTION

1. Technical Field

The present invention concerns a nonflammable halogen-free mixture for making polymer materials with increased heat resistance, particularly for manufacturing electrical, optical cables and lines.

2. Description of the Prior Art

U.S. Pat. No. 4,273,691 discloses nonflammable halogen-free mixtures based on polyolefins which contain certain salts-of a carboxylic acid, such as magnesium stearate, in combination with silicone rubber. These mixtures are used to make insulation for electrical cables. However, these known mixtures do not comply sufficiently with the requirements of the users of such cables who want to prevent flames from propagating along vertically laid cables in case of fire, as well as prevent the dripping of molten insulation materials under increased ambient temperatures.

It is also known to add nonflammable mixtures of polymer materials, which are suitable for insulation and protection, to basic silicone and calcium carbonate materials, and to further supply a selected metal salt of lead, manganese, cobalt, iron, nickel or aluminum as a third component of the basic material. This known mixture also provides such polymer materials with an increased heat resistance, which are therefore suitable for solving special problems. In this case, for example, the automobile industry is a problem area which requires cables or sheathing materials to have increased heat resistance for the wiring in an automobile. The automobile industry also requires that connecting parts that are made of insulation materials, such as plugs, couplings, or connecting flanges have sufficient heat resistance, and at the same time be nonflammable and halogen-free.

Starting with these known mixtures, the invention has therefore the task of providing a mixture which has high heat resistance, is halogen-free, and has nonflammable properties. Additionally, it is important that products made with such mixtures, such as cable and line insulation or sheathing, can be manufactured in a cost-effective manner. The mixtures also allow manufacture of injection molded parts which possess the described properties.

SUMMARY OF THE INVENTION

This task is fulfilled according to the invention by providing a mixture comprising a basic polymer, a salt of a metal selected from the group consisting of Group II, IIa and IIb metals, a metal hydroxide, and a silicone material selected from the group consisting of silicone oil, silicone rubber, and combinations thereof. Such a compound allows the problem-free processing of the mixture, for example, to manufacture electrical and optical cables and lines of insulation materials, fillers or sheathing materials. The compound also allows the mixture to be used as injection molding material, for example to manufacture plugs, couplings, sleeves, tubing, hoses, corrugated tubes and such. For increased heat-resistant polymer materials, the invention provides a nonflammable or flameproof rendering system which increases the oxygen index as a measure of the polymer material's nonflammability.

The invention will be fully understood when reference is made to the detailed description following below.

DETAILED DESCRIPTION OF THE INVENTION

A particularly preferred embodiment of the mixture of the invention is one where the flameproofing system, with reference to 100 parts of basic polymer material, comprises: 1 to 15 parts of the metal salt, 30 to 180 parts of the metal hydroxide, and 0.3 to 20 parts of silicone oil, silicone rubber and combinations thereof. In this combination, the portion of metal hydroxides is significantly reduced as compared to known mixtures, while nonflammability is maintained. Conversely, low-temperature characteristics and mechanical properties are significantly improved. In case of fire, such a mixture produces little smoke and the danger of poisonous gases in the smoke is thereby avoided. Beyond that, the mixture of the invention is DC voltage resistant and the electrical properties, as a whole, can be adapted to the respective requirements without any problems.

In addition to barium stearate or strontium stearate, the metal salts that are used to advantage in accordance with the invention are calcium stearate in particular, the metal salt of carboxylic acid and magnesium stearate, where the latter is preferred as a rule. The particular advantage of the invention can be found in that by providing the claimed components in their entirety as a flameproofing system, the properties of the entire mixture can be changed in a targeted manner by varying other components, so that it becomes possible to optimize the mixture of the invention for the purposes of any requirement.

Preferably, the metal hydroxide is aluminum hydroxide or a magnesium hydroxide, which have proved to be particularly advantageous for carrying out the invention.

As already explained, the components that are added to the basic polymer material form a flameproofing system, which allows the basic polymer to be varied to obtain certain mechanical or electrical properties. In this way, for example, the basic polymer with increased heat resistance can be a high-density polyethylene, but also a mixture of low heat-resistant polymers plus a component which increases the heat resistance, such as, for example, a high-density polyethylene or a polypropylene.

A preferred configuration of the invention results when a polypropylene is used as the basic polymer with increased heat resistance. In conjunction with the claimed flameproofing system, the result is a mixture with good mechanical and electrical properties in the manufactured product. The mixture is cost-effective to produce because it can be made with known commercial processing machines.

Alternatively, the polypropylene can be in the form of a copolymer, such as a PP-block-copolymer, a PP-random-copolymer or a PP-random-block-copolymer.

Also, the mixture composed in accordance with the invention can be extended with inorganic fillers; 10 to 80 parts of fillers per 100 parts of basic polymer proved to be advantageous. Such a filler can be chalk ($CaCO_3$), for example. The improved mechanical properties and surface quality target is furthered when maleic anhydride-grafted basic polymer is used as the additional component of the mixture. It is useful if the portion of such a component is 0.5 to 5 parts per 100 parts of basic polymer.

Independent from the nonflammability and increased heat resistance achieved by the invention, the mixtures that are adapted to the respective purposes of utilization can be easily processed into cross-linkable mixtures and also into non-cross-linkable mixtures. The cross-linking can take place in a peroxide manner within the framework of ordinary conditions with the aid of respective cross-linking media and under pressure and/or heat. The cross-linking can also be carried out by means of a silane-grafted basic polymer, which can subsequently be cross-linked under the influence of moisture, or with high-energy radiation.

By mixing polypropylene-copolymers with corresponding polyolefin polymers or copolymers, such as polyethylene acrylate or vinyl acetate, which can be cross-linked through high-energy radiation, such polypropylene mixtures also become cross-linkable by means of radiation, and thereby become clearly more heat resistant.

At present, it is customary to fill mixtures offered under the flameproof or flame-resistant concept with a large amount of metal hydroxides so that they can withstand prescribed burn tests. However, the high degree of filling of such components degrades the mechanical properties and the low-temperature characteristics of the mixture, and the electrical properties as well, particularly the DC voltage resistance in hot water under continuous voltage load. By contrast, it is important for the essentially flameproofing system of the invention to clearly keep the amount of metal hydroxide low while at the same time maintaining the mixture's nonflammability, as well as improve the low-temperature characteristics and the mechanical properties of the mixture. An electrical improvement of the mixture of the invention is obtained in particular by adding specific amounts of silicone oil or rubber. While a product made with the mixture, for example a cable sheath, typically fails after exposure between a few hours to two days to a DC voltage test at 48 V DC in 85° C. hot water, this test was withstood longer than 30 days by adding, for example, 0.5 to 1% silicone oil to the mixture in the sense of the invention.

The invention is once more explained by means of the following mixing examples:

| Mixing example I | |
| --- | --- |
| PP-Copolymer | 80 to 100 parts |
| Mg (OH)$_2$ | 80 to 110 parts |
| Mg stearate | 3 to 8 parts |
| Silicone oil or rubber | 2 to 6 parts |
| Maleic anhydride-grafted PP | 1.5 to 4 parts |
| Antioxidant | 0.6 parts |
| Properties | |
| Tensile strength | 25 Mpa |
| Elongation at break | 520% |
| LOI (Limiting Oxygen Index) | 29–30 |
| Heat pressure at 120° C. | 15% |
| Fault current measurement after 21 days exposure in 85° C. hot water and at 48 V DC voltage | <0.02 µA |

The significant test result of such a polypropylene-copolymer mixture is to maintain the high limiting oxygen index (LOI), which determines the nonflammability and the heat resistance at 120° C. as well as the DC voltage resistance.

| Mixing example II | |
| --- | --- |
| HDPE | 60 to 80 parts |
| LLDPE | 20 to 40 parts |
| AL (OH)$_3$ | 80 to 120 parts |
| Mg stearate | 3 to 8 parts |
| Silicone oil or rubber | 2 to 6 parts |
| Maleic acid-grafted polyethylene | 1.5 to 4 parts |
| Antioxidant | 0.4 to 0.6 parts |
| Mixing example III | |
| PP-Copolymer | 40 to 50 parts |
| LLDPE | 40 to 50 parts |
| HDPE | 20 to 30 parts |
| Mg (OH)$_2$ | 40 to 55 parts |
| CaCO$_3$ | 40 to 55 parts |
| Mg stearate | 3 to 8 parts |
| Silicone oil or rubber | 2 to 6 parts |
| Maleic acid-grafted PP or PE | 1.5 to 4 parts |
| Antioxidant | 0.4 to 0.6 parts |

The significant properties of mixtures made according to the examples are:

| | |
| --- | --- |
| Tensile strength | 18 Mpa |
| Elongation at break | 540% |
| LOI | 27–31 |
| Heat pressure at 120° C. | 30% |
| Fault current measurement after 21 days exposure in 85° C. hot water and at 48 V DC voltage | <0.02 µA |

The preferred embodiment described above admirably achieves the objects of the invention. However, it will be appreciated that departures of the invention can be made by those skill in the art without departing from the spirit and scope of the invention which is limited only by the claims, which are appended hereto.

What is claimed is:

1. A nonflammable halogen-free mixture for manufacturing electrical cables with increased heat resistance, the mixture comprising:

a copolymer selected from the group of copolymers consisting of a polypropylene block copolymer and a polypropylene random block copolymer;

a salt of a metal selected from the group consisting of Group II, IIa and IIb metals of the periodic system, wherein the metal salt in the mixture is in the range of 1 to 15 parts per 100 parts of copolymer;

a metal hydroxide, wherein the metal hydroxide in the mixture is in the range of 30 to 180 parts per 100 parts of copolymer; and a silicone material selected from the group consisting of silicone oil, silicone rubber, and combinations thereof, wherein the silicon material in the mixture is in the range of 0.3 to 20 parts per 100 parts of copolymer.

2. The mixture as claimed in claim 1, wherein the metal salt is the salt of a carboxylic acid.

3. The mixture as claimed in claim 1, wherein the metal salt of the carboxylic acid is calcium stearate.

4. The mixture as claimed in claim 1, wherein the metal salt of the carboxylic acid is magnesium stearate.

5. The mixture as claimed in claim 1, wherein the metal hydroxide is magnesium hydroxide.

6. The mixture as claimed in claim 1, wherein the metal hydroxide is aluminum hydroxide.

7. The mixture as claimed in claim 1, wherein the mixture further comprises an inorganic filler.

8. The mixture as claimed in claim 7, wherein the inorganic filler is in the range of 10 to 80 parts per 100 parts of polymer.

9. The mixture as claimed in claim 8, wherein the filler is chalk ($CaCO_3$).

10. The mixture as claimed in claim 1, wherein the mixture further comprises maleic anhydride-grafted polymer.

11. The mixture as claimed in claim 9, wherein the maleic anhydride-grafted polymer is in the range of 0.5 to 5 parts per 100 parts of polymer.

12. The mixture as claimed in claim 1, wherein the polymer is cross-linked.

* * * * *